April 9, 1968         E. C. KARP         3,376,943
WEIGHING SCALE WITH OPTICAL READOUT SYSTEM
Original Filed April 9, 1964         5 Sheets-Sheet 1
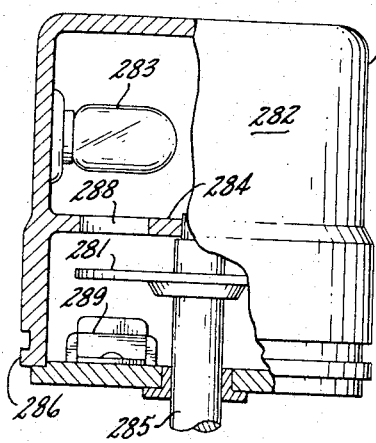
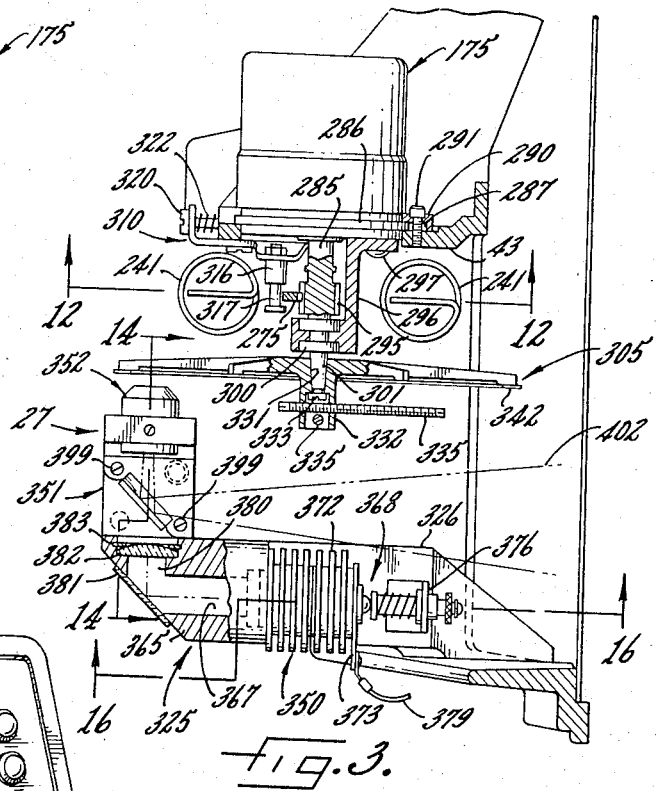
INVENTOR.
Edward C. Karp,
BY Hume, Groen, Clement & Hume
Attorneys.

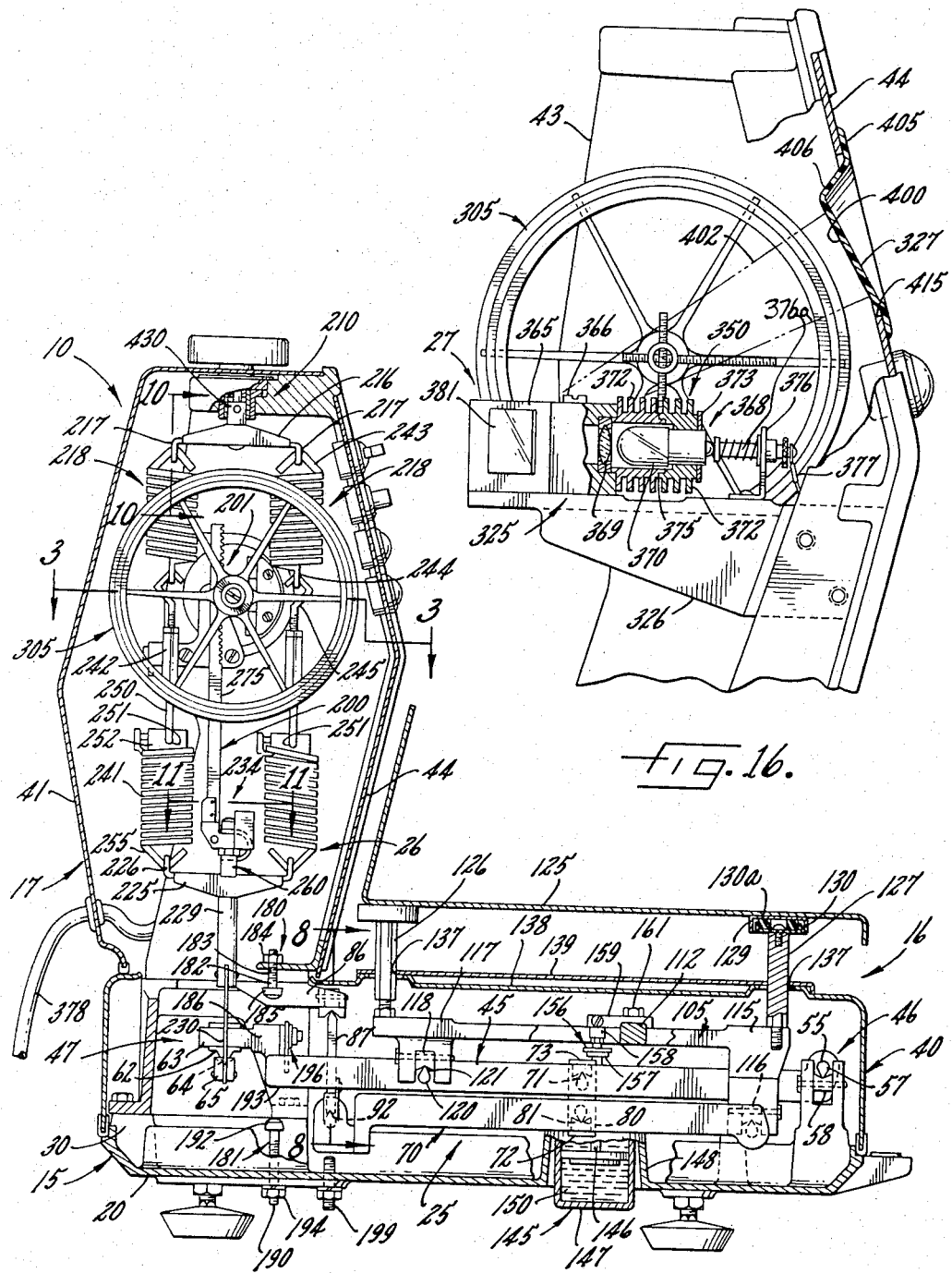

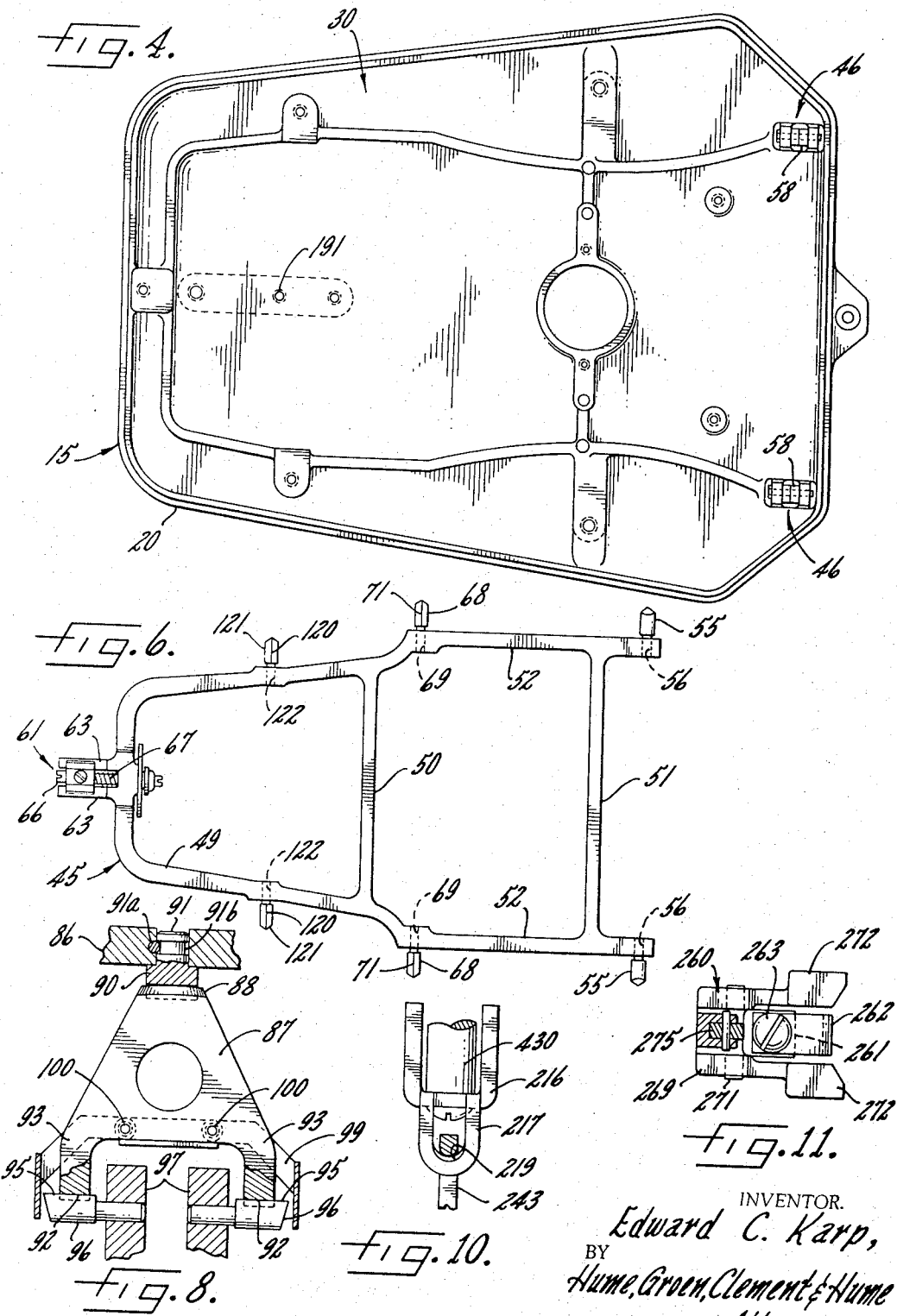

April 9, 1968  E. C. KARP  3,376,943
WEIGHING SCALE WITH OPTICAL READOUT SYSTEM
Original Filed April 9, 1964  5 Sheets-Sheet 4
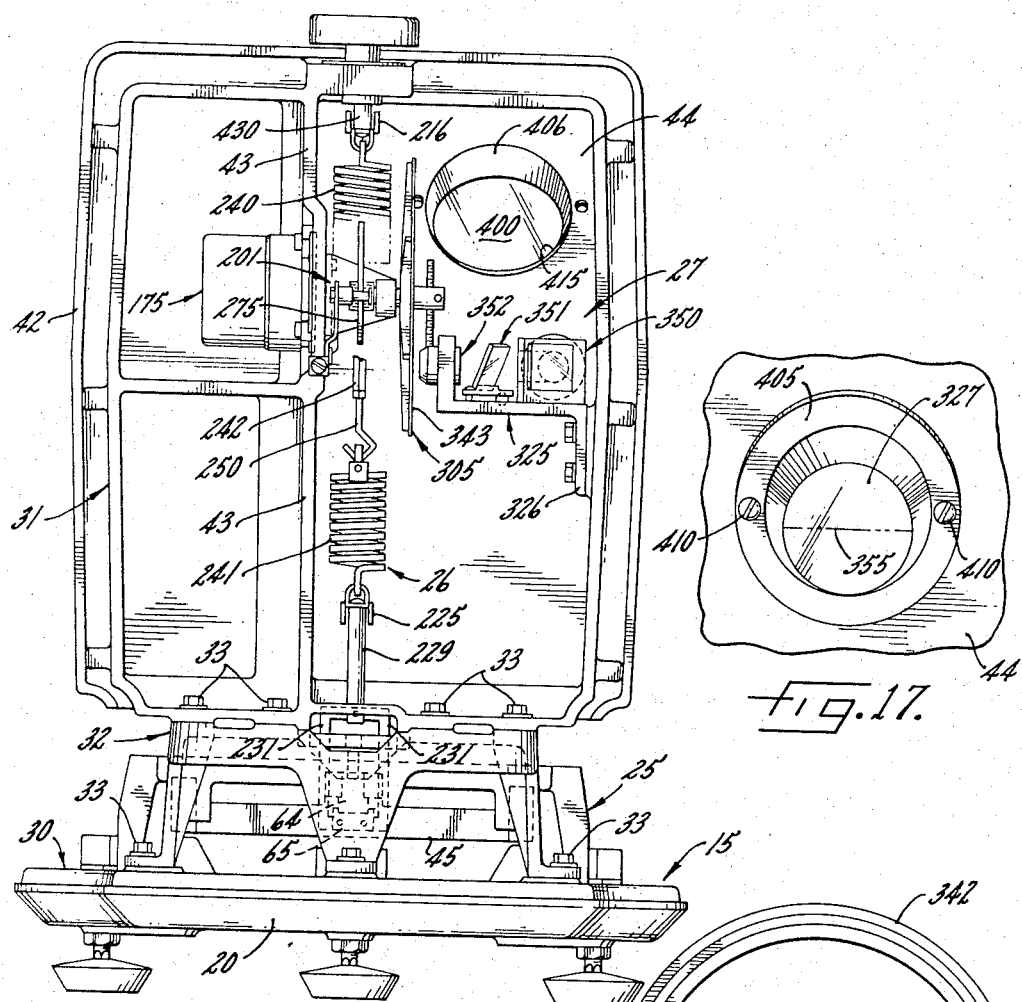
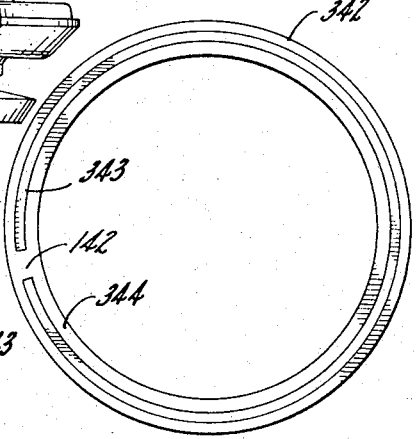
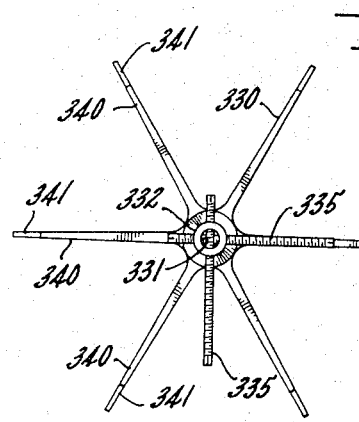
INVENTOR.
Edward C. Karp,
BY
Hume, Groen, Clement & Hume
Attorneys.

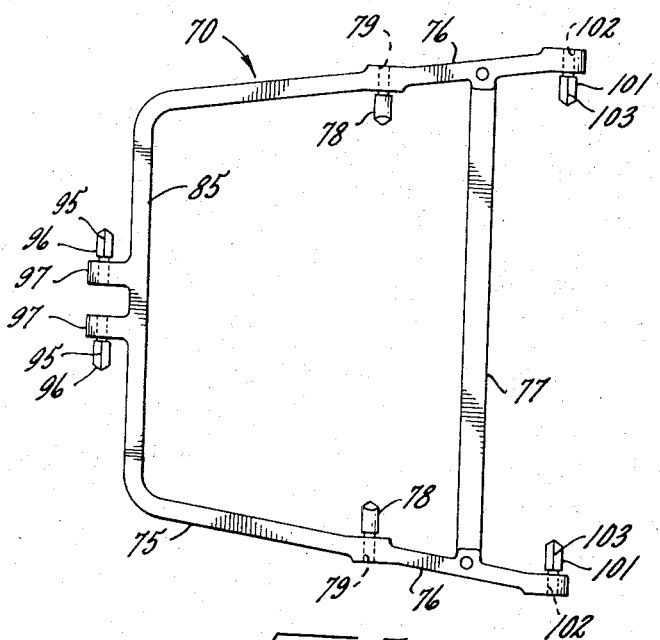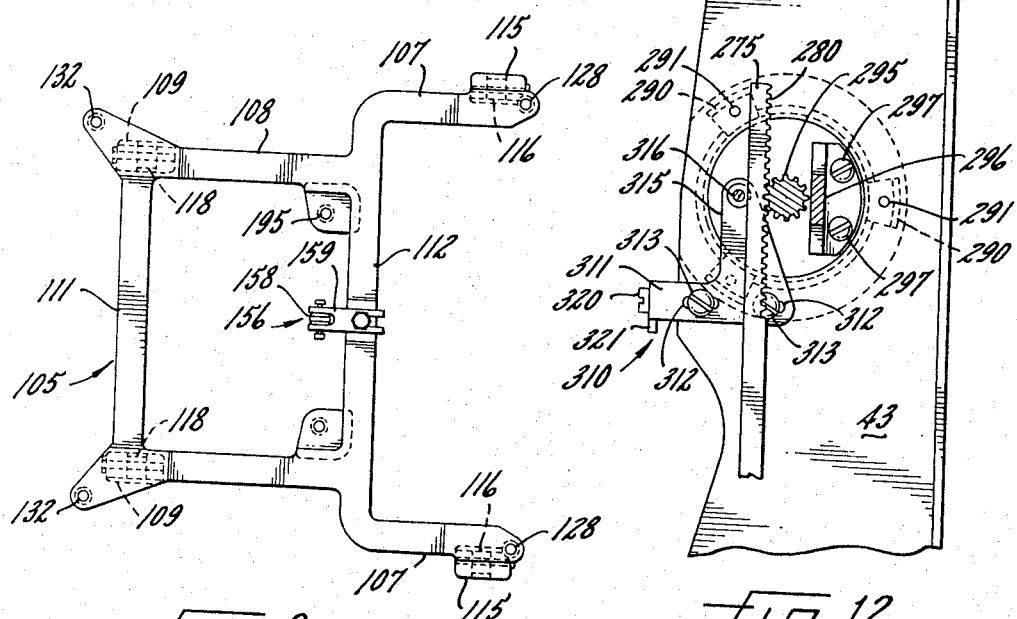

United States Patent Office 3,376,943
Patented Apr. 9, 1968

3,376,943
WEIGHING SCALE WITH OPTICAL READOUT SYSTEM
Edward C. Karp, Belvidere, Ill., assignor to Sanitary Scale Company, Belvidere, Ill., a corporation of Illinois
Original application Apr. 9, 1964, Ser. No. 358,672, now Patent No. 3,308,900, dated Mar. 14, 1967. Divided and this application Apr. 29, 1966, Ser. No. 558,529
4 Claims. (Cl. 177—173)

ABSTRACT OF THE DISCLOSURE

A weight information transmission system for a weighing scale including a weight information wheel mounted on the free end of a rotatable shaft so its hub extends beyond the free end. Threaded balancing pins extend through the hub. The wheel includes a weight information ring seated on the outer ends of spokes extending radially from the hub, said ring has a specular surface which forms a part of an optical readout system.

Specification

This is a division of application Ser. No. 358,672, filed Apr. 9, 1964, now Patent No. 3,308,900, issued Mar. 14, 1967.

This invention relates in general to a weight indicating device and more particularly to a new improved weighing scale. It deals specifically with a weighing scale which is particularly well suited for use in a computing scale complex.

In recent years it has become popular to pre-package meats or the like for display on the counter of a grocery store adjunct to self-service shopping. Such pre-packing, which is particularly well suited to chain grocery store operations, involves weighing each commodity portion accurately and providing its packaging with a label indicating the kind of commodity, its weight, price per pound, and total cost.

It has been found that the answer to providing such information for each piece of commodity lies in a weighing, price computing, label printing complex. Only with such a complex can substantial volume pre-packaging be accomplished and, accordingly, prepackaging be made a truly economical operation. Consequently, there are several computing scale complexes in use today.

A weak link in computing scale complexes presently being used, however, is the actual weighing instrument; in other words, the weighing scale itself. It must provide extremely accurate response to the relatively light packaging material (tare) as well as to the relatively heavy commodity portion. In addition, the rapidity of the scale's response ("time-to-equilibrium") must be exceptional to facilitate rapid computation by the computer component of the complex. Furthermore, the scale should provide rapid recovery between drafts in order to obviate hysteresis errors obtained in weighing devices when packages are "back-weighed." More precisely, when a succeeding package is of lesser weight than its predecessor and follows in rapid weighing sequence, the system should be allowed sufficient recovery time to assure a positive or increasing load application effect to avoid hysteresis errors. Such rapid sequential operation is, of course, typical of "pre-packaging" operations justified an automatic or computing scale complex. The scale must also have a substantial capacity, be of sturdy constrution, and be easy to adjust.

The merit of a weighing scale especially adapted for a computing scale complex is primarily dependent upon two factors. These include: the accuracy and speed of response of the scale mechanism to the weight placed upon it; and the accuracy of transmission of weight information to computing components or the complex and also to a coordinated visual means.

Accordingly, it is an object of the present invention to provide a new and improved weighing scale.

It is another object to provide a new and improved weighing scale especially adapted for incorporation in a computing scale complex.

It is still another object to provide a scale which assures extremely accurate response to loading.

It is a further object to provide a scale of the aforedescribed character which assures extremely fast response to loading (time-to-equilibrium) and to recovery.

It is still a further object to provide a weighing scale of the aforedescribed character which assures extremely accurate transmission of weight information to a computing component of the scale complex and also to a coordinated visual system.

It is yet another object to provide a new and improved weighing scale which facilitates relatively simple adjustment of loading response and weight information transmission.

It is another object to provide a weighing scale which is relatively rugged and yet not ordinarily subject to the usual minor variations of weight response.

The foregoing and other objects are realized in accordance with the present invention by providing a new and improved weighing scale. The scale provides extremely accurate information over a relatively wide range of weights and, accordingly, is specifically adapted for incorporation in a computing scale complex. The invention contemplates a scale wherein a lever arrangement and a balance arrangement, each embodying features of the present invention, cooperate with each other to assure accurate weight information being delivered extremely rapidly to both a computing component of the scale complex, for example, and to a coordinated visual system thereof. In this light, certain significant features of the present invention reside in the visual system. The essence of the scale embodying features of the present invention is extreme accuracy and speed of response, recovery, and transmission of weight information.

For a more complete understanding of the present invention, reference is made to the following description and to the drawings wherein:

FIGURE 1 is a perspective view of the scale embodying features of the present invention;

FIGURE 2 is an enlarged side-elevational view, partially in section and with parts removed, of the scale illustrated in FIGURE 1;

FIGURE 3 is a sectional view taken along line 3—3 of FIGURE 2;

FIGURE 4 is a top plan view of the base of the scale;

FIGURE 5 is a rear elevational view of the frame of the scale, with its housing removed;

FIGURE 6 is a top plan view of the long lever incorporated in the lever arrangement of the scale;

FIGURE 7 is a top plan view of a short lever incorporated in the lever arrangement of the scale;

FIGURE 8 is a sectional view taken along line 8—8 of FIGURE 2;

FIGURE 9 is a top plan view of the platform skelton for the lever arrangement;

FIGURE 10 is a sectional view taken along line 10—10 of FIGURE 2;

FIGURE 11 is a sectional view taken along line 11—11 of FIGURE 2;

FIGURE 12 is a sectional view taken along line 12—12 of FIGURE 3;

FIGURE 13 is a plan view of a spider incorporated in the visual system embodying features of the present invention;

FIGURE 14 is an enlarged sectional view taken along line 14—14 of FIGURE 3;

FIGURE 15 is a plan view of the dial chart incorporated in the visual system;

FIGURE 15a is a greatly enlarged plan view of a portion of the face of the dial chart illustrated in FIGURE 15;

FIGURE 16 is a sectional view taken along line 16—16 of FIGURE 3;

FIGURE 17 is an enlarged fragmentary elevational view of the viewing screen on the face of the weighing scale illustrated in FIGURE 1; and FIGURE 18 is a side elevational view, taken through the encoder, seen in FIGURE 3, partially in section.

Referring now to the drawings, and particularly to FIGURE 1, a weighing scale embodying features of the present invention is seen generally at 10. The weighing scale is a low inertia mechanical device developed especially for extremely rapidly transmitting accurate weight information to a computer for calculating weight-price products, and for providing visual indicia of the weight involved. The scale is adapted to be incorporated in the computing scale complex disclosed in the co-pending application of Edward C. Karp, entitled "Automatic Weighing and Registering System," Ser. No. 228,144, filed Oct. 3, 1962, and assigned to the same assignee as the present invention, now abandoned, and a continuation-in-part application thereof entitled, "Automatic Weighing and Computing and Registering System," Ser. No. 434,169, filed Feb. 8, 1965, now Patent No. 3,262,639, and assigned to the same assignee as the present invention.

In referring to the scale 10 as a low inertia mechanical device, it is intended to explain that relatively slight forces are required to overcome the inertia of the moving components of the scale. In fact, detectable response to as little as 0.0005 pound is achieved. It is the construction and arrangement of components pertinent to the present invention which engender the low inertia characteristics peculiar to the scale 10, and make possible the necessary extreme accuracy, as well as contributing to fast response and recovery.

As seen in FIGURE 2, the weighing scale 10 comprises a horizontal base 15 surmounted by a platform arrangement 16, and an upright body 17. A frame 20 forms the backbone of the base 15 and the body 17. Within the confines of the base 15 and mounted on the frame 20 is a lever arrangement 25 which supports the platform arrangement 16. The lever arrangement 25 cooperates with a balance arrangement 26 inside the upright body 17 to transmit weight information to either a computer component or through a visual system 27 (see FIGURE 3) to provide visual indicia of the weight involved to operating personnel. The lever arrangement 25, the balance arrangement 26, the visual system 27, and their inter-relationship, embody features of the present invention.

Referring for a moment to FIGURES 4 and 5, the lever arrangement 25 is mounted on a horizontal component 30 of the frame 20, while the balance arrangement 26 and the visual system 27 are mounted on a vertical component 31 thereof. An intermediate component 32 of the frame 20 joins the vertical and horizontal components 31 and 30 with conventional machine bolts 33. Each of the frame components 30–32 is preferably formed of cast aluminum, or the like.

According to the present invention, the construction of the lever arrangement 25 and the balance arrangement 26, and their interrelationship, provide a weight-to-counterforce ratio of substantially 1.5 to 1. In other words, every pound and one-half weight increment placed on the scale 10 is opposed by one pound of effective counterforce in the balance arrangement 26. This arrangement is greatly responsible for the fast response of the scale 10 embodying features of the present invention, and is, in turn, made possible primarily by features of the lever arrangement 25. The balance arrangement 26 is specifically adapted to accommodate such a ratio, of course. To achieve such a weight-to-counterforce ratio, the lever arrangement 25 accommodates a substantial amount of vertical travel of the tray arrangement 16 between the limits of the scale 10. Accordingly, extensive platform arrangement travel is a characteristic of the present invention. In addition, components of the lever arrangement are, for the most part, formed of extremely rigid cast iron whereby slight bending deviations are substantially avoided.

The lever arrangement 25 is enclosed by a housing 40 (see FIGURE 1) forming part of the base 15 and suitably mounted on the horizontal component 30 of the frame 20; the horizontal component being shaped generally like a flat tray with upturned sides. On the other hand, the upright body 17 of the scale 10 includes a housing 41 which encloses the balance arrangement 26 and the visual system 27 and is suitably mounted on the vertical frame component 31; the vertical frame component being defined by a generally rectangular rim 42 having a vertically extending rib 43. The housings 40 and 41 are preferably formed of polished aluminum. The front of the upright body 17 is enclosed by face plate 44 suitably secured to the rim 42 and carrying various indicating and operating equipment and the like, hereinafter discussed. In this light, the design invention of the scale 10 is the subject of the co-pending application of Edward C. Karp, Ser. No. 78,636, filed Feb. 14, 1964, now Design Patent No. 202,124, and assigned to the same assignee as the present invention.

Referring to FIGURES 2, 4, and 6, the lever arrangement includes a long lever 45 which is fulcrumed on the horizontal frame component 30 at 46 and connected to the balance arrangement 26 at 47. The long lever 45 comprises a U-shaped skeletal member 49 formed of cast iron for rigidity and having cross braces 50 and 51 interconnecting its legs 52. A pair of pivot pins 55 seated in holes 56 in the free ends of the legs 52 form downwardly oriented knife edges 7 which seat in corresponding V-bearings 58 approximately mounted on the horizontal frame component 30. To connect the long lever 45 to the balance arrangement 26, the base of the skeletal member 49 has a cantilevered clevis arrangement 61 extending therefrom and slidably carrying a nose block 62 between its legs 63. A downwardly oriented nose knife edge 64 is formed on the bottom of the nose block 62, as will be noted, and seats in a V-bearing 65 of the balance arrangement 26.

The nose block 62 carrying the knife edge 64 is longitudinally movable in the clevis arrangement 61 by manipulating an adjustment screw 66 against the bias of a coil spring 67 appropriately mounted in the clevis arrangement. Longitudinal movement of the nose block 62 varies the effective length of the long lever 45, of course, by varying the distance between the knife edges 57 and the knife edge 64. Accordingly, the moment arm acting on the balance arrangement 26 is correspondingly varied.

Adjacent the cross brace 50 between the legs 52 of the long lever 45 are mounted a pair of pivot pins 68, in corresponding holes 69. A short lever 70 is suspended from upwardly oriented knife edges 71 formed on the pins 68 by corresponding hanger brackets 72 (see FIGURE 2) which have upper V-bearings 73 formed thereon for suspension from the knife edges.

Referring to FIGURE 7, the short lever 70 comprises a generally U-shaped skeletal member 75 formed of cast iron for rigidity and including legs 76 and a cross brace 77. The short lever 70 mounts a pair of pivot pins 78 in corresponding holes 79 of the legs 76, and the pins 78 have downwardly oriented knife edges 80 formed thereon which seat in lower V-bearings 81 formed on the corresponding hanger brackets 72. The short lever 70 is thus suspended from the long lever 45.

The short lever 70 is fulcrumed at its base 85 on an appropriately formed scale frame extension 86 of the vertical frame component 31 through a triangular thrust link 87. The link 87, which is seen in detail in FIGURE 8, has a knife-like arcuate upper edge 88 which seats in a V-bearing 90 formed in the head of a shoulder stud 91 mounted on the aforementioned extension 86. A tangentially inserted pin 91a in the extension 86 engages an annular groove 91b in the shank of the stud 91 to retain the stud in the extension while permitting its rotation for alignment with the knife edge 88. A pair of spaced V-bearings 92 formed in base legs 93 of the link 87 receive upwardly oriented knife-edges 95 formed on the oppositely disposed ends of pivot pins 96 suitably mounted in centrally disposed projections 97 cantilevered from the base 85 of the short lever 70. A retainer bracket 99 connected to the link 87 by screws 100 prevents lateral displacement of the link on the knife edges 95.

The free ends of legs 76 in the short lever 70 mount inwardly extending pivot pins 101 in holes 102. The pins 101 have upwardly oriented knife edges 103 which support a platform skeleton 105 (see FIGURE 9) on corresponding ends 107 of the legs 108. The opposite ends 109 of the platform skeleton's legs 108 are supported from the long lever 45 in a manner which will be discussed hereinafter. The platform skeleton 105 supports the platform arrangement 16, of course.

The platform skeleton 105 is broadly rectangular in configuration, its legs 108 being interconnected by cross braces 111 and 112. The skeleton 105 is formed of cast iron for rigidity and it has downwardly extending feet 115 formed at corresponding ends 107 of its legs 108, the feet 115 having V-bearings 116 suitably mounted thereon for seating on the upwardly oriented knife edges 101 of the short lever 70.

At the opposite ends 109 of the legs 108, downwardly extending feet 117 suitably mount V-bearings 118. The V-bearings 118 rest on corresponding upwardly oriented knife edges 120 formed on pivot pins 121 extending outwardly of the legs 52 of the long lever 45. The pins 121 are seating in holes 122 in a well-known manner. The V-bearings 116 and 118 are mounted in predetermined position in corresponding legs 115 and 117 of the platform skeleton 105 to assure assembling the lever arrangement 25 with the platform skeleton 105 in level relationship.

The platform arrangement 16 is mounted on the platform skeleton 105, as has been pointed out, and comprises a generally L-shaped platter 125, a pair of rear standards 126, and a pair of front standards 127. The front standards 127 are aluminum posts carrying axially aligned bottom screws which are screwed into internally threaded holes 128 in corresponding ends 107 of the legs 108. An inverted cup 129 is suitably secured to the bottom of the platter 125 in alignment with each post 127. An upright cup 130 having a rubber cushioning ring 130a cemented inside is suitably secured to the upper of each post 127. As illustrated, each inverted cup overlies a corresponding ring 130a and cup 130.

The rear standards 126 comprise alumnium posts adjustably mounted in apertures 132 on corresponding ends of the legs 109. Cushioning arrangements identical to those described immediately above support the platter 125 on the posts. They include inverted cups 129 suitably secured to the platter and upright cups (not shown) secured to the posts and having rubber rings (not shown) therein. The rubber cushioning rings 130a damp the mild shock loads applied to the platter 125, of course.

The platter 125 is thus seated on the standards 126 and 127 for easy removal therefrom by lifting the cups 129 off the cups 130. However, the platter 125 is laterally fixed in position on the posts 126 and 127 by the cups 129 overlying the cups 130. By adjusting the length of the rear posts 126, the level of the platter 125 can readily be adjusted. The configuration of the platter 125 might vary considerably for various uses within the scope of the present invention.

As will be recognized, the legs 126 and 127 actually extend upwardly through appropriately formed apertures 137 in the base housing 40. To facilitate access to the interior of the housing 40, the nose iron adjusting screw 66, the lever arrangement 25, and other adjusting means and the like within the housing 40, a large circular opening 138 is formed in the housing 40 underneath the platter 125. A loosely fitting cover 139 overlies the opening 138 to prevent foreign matter from falling into the housing 40 during operation of the scale and is removable when the platter 125 is removed.

It will be noted that the legs 126 and 127 are relatively long. This is to accommodate the substantial travel of the platform arrangement 16 for a predetermined total weight capacity accommodated by the lever arrangement 25, according to the present invention. In the present instance, the weight capacity of the scale is 25.5 pounds, a suitable range for weighing meat portions or the like, and sufficient vetrical travel of the tray arrangement 16 occurs between zero and twenty-five and one-half (0–25.5) pounds to effect 1.733 inches of vertical travel of the long lever 45 at its point of connection to the balance arrangement 26. Actually an overweight zone 142 (see FIGURE 15) which also accommodates tare loading is provided, and the scale 10 will react to a maximum of 26.48 pounds while the tray arrangement 16 travels 1.80 inches vertically to accommodate such an overweight zone.

The effective length and dimensional relationships of the long and short levers 45 and 70, and the platform skeleton 105, reuslt in a weight-to-balance arrangement counterforce ratio of 1.5 to 1 for the scale 10, as has been pointed out. In this light, the effective length of the long lever 45 is fifteen inches, adjustable to a slight extent. The effective length of the short lever 70 is, on the other hand, 10.625 inches, and the long and short levers 45 and 70 are connected together six inches from the front fulcrum point 57 of the long lever 45 and 4.25 inches from the front fulcrum point 103 of the short lever. The effective length of the platform skeleton 105 is 8.25 inches and it rests at the front fulcrum point 103 of the short lever 70 and five inches from the rear fulcrum point 64 of the long lever 45.

It is relatively easy to see that if all the weight on the platform arrangement 16 is concentrated immediately over the point where the plafform skeleton 105 seats on the long lever 45, the desired weight to counterforce ratio of 1.5 to 1 is obtained. However, this ratio is maintained as the weight concentration is moved toward the front of the platform skeleton 105 because the shift in weight concentration brings more weight to bear on the short lever at the aforedescribed point, and the characteristics of the lever arrangement 25 embodying features of the present invention assure its consistent maintenance of the ratio. In other words, regardless of where weight is concentrated on the platform arrangement 16, the unique features of the lever arrangement 25 assure a precise weight-to-counterforce ratio of 1.5 to 1 and, accordingly, rapid "time-to-equilibrium" and recovery, accompanied by extreme accuracy.

As the platform skeleton 105 moves up and down within the housing 40, a dashpot arrangement 145 of well known construction effects a damping influence on it. The dashpot arrangement 145 includes a piston assembly 146 connected to the central cross brace 112 of the platform skeleton 105 and slidable in a dashpot 147 mounted within an appropriately formed well 148 integral with the horizontal frame component 30 of the frame 20. The dashpot 147 is suitably filled with a damping liquid 150 characterized by minimal viscosity variance with temperature.

The piston assembly 146 is suitably secured at its upper end 156 to a fitting 157 depending from a dashpot link 158. The dashpot link 158 is pivotally suspended from a cantilevered member 159, the cantilevered member 159 being adjustably mounted on the cross brace 112 of the platform skeleton 105 by a conventional machine bolt 161. The piston assembly 146 acts on the platform skeleton 105 at a point approximately 3.75 inches from the front V-bearings 116 on the skeleton and in front of the link 72 connecting the long and short levers 45 and 70. Outside of its dimensional relationship to the lever arrangement 25, the operation and construction of the dashpot arrangement 145 is substantially conventional and it is not described here in detail.

As the lever arrangement 25 responds to an object being placed on the platform arrangement 16, the long lever 45 moves downwardly against the restraint of the balance arrangement 26, which reacts to a predetermined extent corresponding to the weight of the object. The amount of reaction is indicative of the weight involved. The visual system 27 interprets the amount of reaction of the balance arrangement 26, according to the present invention, translating it into analog weight information, and transmits the weight information visually to operating personnel. At the same time, weight information is transmitted to a computing component of the complex by an encoder 175, through a computer pick-up element (discussed hereinafter) in the encoder.

The encoder 175, which is hereinafter discussed in greater detail in specific relation to the present invention is preferably of the type disclosed generally in United States Patent No. 2,949,539; a 200 series encoder such as produced by AR & T Electronics, Inc., a subsidiary of the Baldwin Piano Company, is eminently suitable. Suffice it to say at this point that it is an optical encoder which introduces a minimal frictional and inertial loading effect to the operation of the scale and, accordingly, contributes substantially to both accuracy and speed of response.

It should be pointed out at this point that movement of the lever arrangement 25 upwardly or downwardly within the base 15 of the scale 10 is restrained at predetermined limits by bumpers 180 and 181 mounted within the base, as seen in FIGURE 2. The upper bumper 180 comprises a bolt 182 screwed into an aperture 183 within the rim 42 of the scale frame 20 and fixed in position by a locknut 184. A rubber cushion 185 is suitably affixed to the head of the bolt 182 and is spaced a predetermined distance from the top 186 of the cantilevered clevis arrangement 61 of the long lever 45. Upward movement of the lever 45, and, consequently, the lever arrangement 25 is thus limited.

Downward movement of the lever 45 is limited by the lower bumper 181. It includes a bolt 190 screwed into an aperture 191 (FIGURE 4) in the horizontal component 30 of the frame 20. The bolt 190 has a rubber head 192 affixed to it and spaced a predetermined distance from the bottom surface 193 of the base 60 in the long lever 45, which it is designed to engage to prevent excessive lever arrangement 25 to travel downward. A locknut 194 holds the bolt in a preset position.

To immobilize the lever arrangement 25, i.e., for shipment, etc., immobilizing bolts (not shown), inserted through the apertures 195 in the platform skeleton 105 (FIGURE 9) at the time of assembly, are turned down to thrust against the frame component 30 (FIGURE 4). This draws the lever arrangement upwardly through the medium of the conventional pivot caps (not shown) against a spacer 196 (FIGURES 2 and 6), to immobilize the lever arrangement 25 in approximately one-half capacity position. Collaterally, a bolt 199 extending through the frame component 30 acts as a stop to prevent complete disengagement of the short lever 70 from the thrust link 87.

The spacer 196 is merely a triangular spacer member 197 pivotally mounted on the shank of a spline nut 198 press fit in place in the base 60 of the long lever 45. The aforedescribed adjusting screw 66 is, in fact, threaded through the spline nut 198. For shipment, the spacer member 197 is pivoted from the position shown in FIGURE 2 to an uppermost position wherein it engages the frame extension 86 as the immobilizing bolts (not shown) are tightened.

Referring to FIGURE 2, once more, the balance arrangement 26 comprises a rack assembly 200 which responds vertically to a predetermined extent for each weight graduation placed on the platform arrangement 16. The rack assembly 200 effects a predetermined angular response of a pinion assembly 201 for each weight graduation. The pinion assembly 201 is effective to transmit this predetermined angular response, indicative of the weight of the object on the platform, through the encoder 175 mounted on the vertical rib 43 of the frame 20 to the computing component of the computing scale complex. The encoder 175 transmits this information by code to the computing component which assimilates the weight information and provides price information for the meat product.

At the same time, the pinion assembly 201 transmits this predetermined angular response, indicative of the weight of the object on the platform arrangement 16, through the visual system 27 to operating personnel. The visual system 27 interprets the angular response in terms of weight in pounds of the object being weighed. This weight information is indicated to operating personnel on the face 44 of the scale in a manner which will hereinafter be discussed in detail.

The rack assembly 200 is suspended from a tare set, zero adjust, and zero stop assembly 210 mounted on the top cross piece 211 of the scale frame 42. The assembly 210 is preferably substantially identical to that disclosed in the Karp et al. Patent No. 2,658,746, and its construction is not described in detail here. Its operation is described broadly hereinafter, however, to better facilitate an understanding of the complete operation of the scale 10.

The rack assembly 200 includes a yoke 216 having spring hangers 217 (see FIGURE 10) depending from its opposite ends. These spring hangers 217 suspend identical spring sub-assemblies 218 from curved, highly polished, case-hardened supporting surfaces 219. An identical yoke 225 is suspended from the lower end of each of the spring assemblies 218 by coresponding spring hangers 226 identical in construction to the spring hangers 217 described above. A clevis rod 229 depends from the yoke 225. The aforedescribed V-bearing 65 depends from the legs 231 of the clevis rod 229 on a flexible metal strip 230. The long lever 45 is fulcrumed in the V-bearing in the manner hereinbefore pointed out. The use of extremely smooth and hard supporting surfaces on the spring hangers 217 and 226 reduces the friction, of course. This contributes to the accuracy of the scale 10, as has been pointed out.

Turning once more to the operation of the balance arrangement 26, it will be seen that movement of the long lever 45 downwardly under the influence of weight on the platform arrangement 16 causes the yoke 225 to move downwardly against the opposition of the spring sub-assemblies 218. A vertically extending rack arm sub-assembly 234 mounted on the yoke 225 moves concurrently with the yoke, of course. This rack arm sub-assembly 234 effects rotation of the pinion assembly 201 as it moves vertically, and the pinion assembly 201 transmits weight information through the encoder 175 to a computing component and to operating personnel through the visual system 27.

The amount of vertical travel of the rack arm sub-assembly 234 under the influence of a predetermined weight on the tray arrangement 16 is dependent upon the counterforce of the spring sub-asembly 218 with deflection, of course. Each spring sub-assembly 218 comprises an upper helical spring 240 and a lower helical spring 241 inter-connected by a locking turn-buckle 242, each upper helical spring 240 having a hanger hook 243 formed at its lower end. The upper hanger hooks 243 rest in the spring hangers 217 depending from the yoke 216, while the lower hooks 244 have the upper hooks 245 of the locking turn-buckles 242 seated therein.

The lower hooks 250 of the locking turn-buckles 242 are received in apertures 251 formed in Chatillon calibrators 252 connected to the top of each of the lower helical springs 241. The calibrators 252 secure the locking turn-buckles 242 to the lower helical springs 241 in a well-known manner to facilitate minor adjustments in spring length with concomitant variation in spring capacity calbiration. The turn-buckle hooks 245 and 250 are also case hardened to provide extremely low friction supporting surfaces.

At the lower end of each of the lower helical springs 241, a hanger hook 255 is formed, substantially identical to the upper hanger hooks 243 of the upper helical springs 240. The spring hangers 226 extending upwardly from the lower yoke 225 are seated on the hanger hooks 255, as will be recognized.

As a feature of the present invention, in order that friction be kept at a minimum in the relatively movable connections of the balance arrangement 26, the arc of the hanger hooks 243 and 255 is made larger than the curvature of the hardened hanger hook surfaces 219 to which they are connected. Such is the case, in fact, with all the spring supporting connection surfaces. The result is substantially point contact between such connection surfaces.

Since the scale 10 embodying features of the present invention incorporates a lever arrangement 25 which promulgates a low weight to counterforce ratio of substantially 1.5 to 1, it will be recognized that the helical springs 240 and 241 must be of substantial effect. For the 25.5 pound capacity of the scale 10, the combined spring force of the springs 240 and 241 must be at least .667 of this, or 16.98 pounds. Actually, as has been pointed out, a slightly greater maximum spring force is provided because of the aforementioned overweight zone incorporated in the scale 10. Thus, the total spring force is actually 17.653 pounds under what is referred to as total applied load. The initial loading of the springs 240 and 241 at the zero reading of the scale 10 is approximately 11 pounds.

As the spring sub-assemblies 218 react to up and down movement of the long lever 45, the rack arm assembly 234 moves up and down also, as has been pointed out. The rack arm assembly 234 includes a mounting saddle 260 seated on the yoke 225 and extending upwardly therefrom. A bar 261 is secured to the top of a U-shaped bimetallic member 262 by a screw 263. The bimetallic member 262 is, in turn, secured to the saddle 260 and provides a temperature compensation medium in the balance arrangement 26 in a well known manner.

The rack arm assembly 234 further includes an L-shaped base 269 pivotally connected at 271 to the bar 261 (see FIGURE 11). Weighted legs 272 on the base 269 urge the rack arm 275 into operative engagement with the pinion assembly 201. To this end, the rack arm 275 carries a series of precisely formed gear teeth 280 on its upper end.

The pinion asembly 201, which is operatively engaged by the teeth 280 of the rack arm 275, is mounted on the vertically extending rib 43 of the scale frame 20. The pinion assembly 201 includes a pinion shaft 285 which is actually the drive shaft of the encoder 175 hereinbefore referred to.

As seen in FIGURE 18, the encoder 175 comprises a code disc 281 which is mounted on the shaft 285 within the cylindrical case 282 of the encoder. Separating a lamp 283 from the disc 281 is a plate 284 having an elongated aperture 288 formed in it. Light from the lamp 283 is thus permitted to impinge on only a narrow radial strip of the disc. Opposite the disc 281 from the lamp 283 is a plurality of silicon photo diodes 289, disposed to pick up light signals passed through the disc.

The disc 281 is formed with light transmission areas indicative of various codings, as is well known. As the shaft turns, coded information is picked up by the photo diodes 289, which comprise the aforementioned "pick up element" and form part of the computing component of the complex. In the present instance the Gray code form is used and the disc 281 is a Gray code disc. Most important to the accuracy and response of the scale 10, however, is the fact that very little frictional resistance is introduced to scale 10 operation through the shaft 285 because its only connection to the computing component is an optical one.

A rim 286 is formed around one end of the encoder housing 282 adjacent the pinion shaft 285 for seating in an annular recess 287 formed in the vertical rib 43 of the scale frame 20. Three L-clamps 290 held by conventional machine screws 291 overlie the rim 286 on one side thereof and hold the encoder 175 in angular fixed position on the rim 43. The angular relationship of the encoder 175 is extremely important to the transmission of weight information to the computing component since rotating the housing 282 varies its own preset zero point because the angular position of the shaft 285 is fixed by the rack arm 275 at any one time.

The pinion shaft 285 carries a precisely formed pinion gear 295 which is normally in mesh with the teeth 280 on the rack arm 270. A generally Z-shaped bracket 296 mounted on the front of the encoder 175 by conventional machine screws 29 (only one shown) supports the shaft 285 outwardly of the gear 295; the shaft 285 extending through a bearing assembly 300 in the bracket 296.

Outwardly of the bearing assembly 300 the shaft 285 is tapered and, as will be seen, this tapered extension 301 mounts a weight information wheel 305 which is a component of the visual system 27. The weight information wheel 305, which embodies features of the present invention, will be discussed in greater detail in a subsequent discussion of the construction and operation of the visual system 27.

Referring to FIGURES 3 and 12, the series of teeth 280 on the rack arm 270 are prevented from substantially disengaging from the precisely formed pinion gear teeth 295 on the shaft 285 by an adjustable bracket assembly 310. The adjustable bracket assembly 310 includes a somewhat irregularly shaped member 311 which is mounted on the vertically extending rib 43 of the scale frame 20. The member 311 has a pair of elongated slots 312 formed in it through which shouldered screws 313 extend into appropriately formed internally threaded apertures (not shown) in the rib 43. The screws 313 provide a smooth shank on which the member 311 is slidable along the length of the slots 312.

An upwardly extending arm 315 of the member 311 carries a pin 316 thereon having an annular recess 317 formed therein providing a track for "restraining" the rack arm 275 as it moves vertically. By "restraining" it is meant that the rack arm 275 is not actually held in engagement with the pinion gear 295 by the pin 316 but rather the pin acts as a back stop to prevent the gear teeth from jumping out of mesh. In normal travel of the rack arm 275, no contact between the pin 316 and the rack arm 275 takes place. It is only at the initial shock of the load being placed on the platform arrangement (or removed), for example, that the rack arm tends to jump backwardly until restrained by the pin 316.

To properly position the pin 316 an adjustment screw 320 is provided extending through an ear 321 of the member 311 into an internally threaded receiving aperture (not shown) in the rib 43. Screwing the adjustable screw 321 inwardly moves the member 311 toward the pinion gear 295, of course. A coil spring 322 surrounds the screw 320 between the ear 321 and the rib 43 and biases the member 311 away from the pinion gear 295. Accordingly, turning the screw outwardly allows the spring 322 to move the pin 316 away and provide greater spacing between it and the rack arm 275.

Referring now to the visual system 27, it is designed, of course, to accurately interpret the angular rotation of the pinion shaft 285 in terms of weight carried by the platform arrangement 16. The visual system 27 includes the weight information wheel 305 which carries visible weight graduation indicia for optical transmission to operating personnel by an optical transmission unit 325. The unit 325 is seated on a bracket 326 suitably mounted on the rim 42 of the scale frame 20, and embodies features of the present invention. This visual weight information is indicated to operating personnel on a viewing screen 327 in the face 44 of the scale 10.

The weight informaton wheel 305 comprises a spider 330 (see FIGURE 13) formed of magnesium or magnesium-aluminum alloy for extreme lightness and having a tapered aperture 331 extending through its hub 332 (see FIGURE 3). The spider 330 fits snugly and precisely onto the tapered extension 301 of the pinion shaft 285 and a locking screw 333 holds it onto the shaft 285. The hub 332 protrudes beyond the tapered extension 301, as will be recognized, and a pair of fully threaded balancing screws 335 extend at right angles to each other through appropriately threaded apertures (not shown) in the hub. This arrangement of balancing screws 335 facilitaties perfectly balancing the weight information wheel 305 and the encoder shaft 285 on its axis by quarters and, consequently, contributes to the extreme accuracy of the scale. This quarter-balancing arrangement collaterally facilitates minutely adjusting all moving parts of the scale mechanism to linearity.

The spider 330 includes six radiating arms 340 having tiny coplanar platforms 341 carefully machined on their outer ends. Mounted on these tiny platforms 341 with a suitable adhesive is a lightweight ring 342 formed of approximately .020 inch thick aluminum sheet on which is imprinted a dial chart 343 of weight indicia. The chart 343 includes weight information evenly spaced around the ring 342, from zero to 25.5 pounds in the present instance (only partially shown), on a surface 344 which is treated so as to have a specular finish providing high reflection characteristics. The optical transmission unit 325 scans the surface 344 and, accordingly, the weight chart 343, picks up weight information indicative of the weight of the object carried by the platform arrangement 16, and transmits this weight information in visual form to the screen 327.

The optical transmission unit 325 includes a magnified light source assembly 350 mounted on the bracket 326. The light source assembly 350 directs a beam of light through a canted axis beam splitter assembly 351 and through a lens assembly 352 onto the dial chart 343. The illustrative image pickup is shown in FIGURE 15a. The image is reflected back from the dial chart 343 through the lens assembly 352 and off the beam splitter assembly 351 onto the viewing screen 327 on the face 44 of the scale 10. The viewing screen 327 carries a zero reference line 355 (see FIGURE 17) which, when the scale has been properly adjusted in a manner hereinafter discussed in detail, coincides with the zero weight indicia graduation 356 on the dial chart 343.

The magnified light source assembly 350 comprises a housing 365 fixed on the bracket 326 by a conventional machine bolt 366 (or bolts), and having a first passage 367 extending therethrough. A light source 368 is situated in one end of the passage 367 behind a double convex lens, 369. The light source 368 includes a light bulb 370 removably seated within a mated pair of finned cooling and light sealing cylinders 372. The cylinders 372 retain the bulb 370 inside them as long as they are held together at mating lips 375, a lip of the inner cylinder 372 mating with the housing 365 also, and prevent light leakage to the screen 327 as well as serving a cooling function. An L-shaped bracket 376 carries a spring loaded contact member 376a which releasably holds the bulb 370, through its radially extending base pins, against a grounding contact washer 373 on the cylinders 372, and holds them together against the housing 375.

An electrical lead 377 attached to the contact member 376a taps off the power cable 378 entering the body 17 (see FIGURE 2) and provides a source of current for the light source assembly 350. A flexible grounding conductor 379 is attached to the contact washer attachment lug.

A beam of light is focused down the passage 367 by the lens 369 and reflected at a 90° angle down a second passage 380 within the housing 365 by a mirror 381 mounted with adhesive at corresponding ends of the passages 367 and 380. The now widening light beam is re-focused by a single convex lens 382 mounted at then end of the second passage 380 behind retaining ring 383.

The re-focused beam of light passes through the canted axis beam splitter assembly 351 (see FIGURE 14) and subsequently through the lens assembly 352 onto the dial chart 343 of the weight information wheel 305. The weight indicia image (see FIGURE 15a) underlying the lens assembly 352 is reflected back through the lens assembly 352 onto the canted axis beam splitter assembly 351, which reflects the image onto the viewing screen 327. The lens assembly 352 is conventional in construction and, accordingly, is not discussed in detail. Suffice it to say that the lens assembly 352 acts as a condensing lens for light passing to the dial chart 343, and as an objective lens for the reflected image.

The canted axis beam splitter assembly 351 includes a generally rectangular base 390 secured to the bracket 326 in the path of the light beam from the mirror 381 to the dial chart 343. Fixedly mounted on the base 326 in diagonal relationship on the square bracket 390 is the beam splitting mirror 391. The mirror 391 is canted generally toward the lens assembly 352 at an angle of approximately 25° and, as will be seen in FIGURE 14, extends through the path of the light beam and the longitudinal axis of the lens assembly 352.

The substantially square base 390 of the beam splitter assembly 351 is mounted on the bracket 326 in a manner which readily facilitates adjustment of the plane of the mirror 391 about any axis. This permits adjusting the position of the reflected image on the viewing screen 327, of course.

The mounting arrangement includes a ball bearing 393 seated in a conically shaped depression 394 on the bracket 326. A short helical coil spring 395 is also appropriately seated in a depression 396 on the bracket 326. The base 390 includes a conical recess 397 in its lower surface for resting on the ball bearing 393, and a recess 398 in its lower surface opposite the ball 393 for receiving the helical spring 395. A pair of adjusting screws 399 bracketing the ball 393 and the spring 395 and extending through the base 390 into internally threaded apertures in the bracket 326 in threaded relationship facilitate tilting and holding the mirror 391 on virtually any axis, as will be recognized.

The viewing screen 327, as illustrated in FIGURES 16 and 17, is a single piece of transparent molded acrylic plastic. The screen 327 is coated on its rear surface with a layer of translucent plastic to define a focal plane and form a flat circular screen area 400. The zero reference line 355 is marked in the center line of the translucent coating formed on rear surface of the screen area 400. This is to prevent parallax error which might occur if the line 355 were on the front of the screen 327. Moving the coated screen area 400 to the front of the screen 327 would cause some light loss at the first interface, of course. The screen area 400 is preferably perpendicular to the axis of the light beam 402 directed from the beam splitter mirror 391 onto the screen 327, to prevent distortion of the image.

The screen 400 is recessed from a rim 405 on a varying height inclined wall 406. The rim overlies the surface of the face 44 on the scale 10, as will be seen, and is secured to the face by screws 410, threaded in suitable apertures in the face 44. The screws 410 extend through slightly enlarged holes in the rim 405 and, accordingly, the screen 27 can be moved about slightly in the aperture 415 in which it rests. The significance of this slight adjustability will be pointed out in the following discussion of the adjustment capability of the scale.

The primary adjustment of the scale zero point is accomplished with the course zero adjustment assembly 210, as would be expected. Manipulating zero adjustment assembly 210 in the manner disclosed in the aforementioned karp et al patent has the effect of raising or lowering the yoke 216 of the rack assembly 200. The yoke 216 has a threaded upwardly extending pin 430 suitably attached to it and the pin 430 is, in turn, suitably retained in the adjustment assembly 210.

Raising or lowering the yoke 216 with the coarse adjustment assembly 210 raises or lowers the entire rack assembly 200, of course, since the long lever 45 moves upwardly with the rack assembly. As the rack assembly 200 moves upwardly, for example, the pinion shaft 285 is rotated in one direction. This rotation has the effect of angularly adjusting the zero point in the encoder 175 and also the zero pointer on the dial chart 343. Thus, the primary adjustment assembly 210 facilitates adjustment of the entire system to zero and also provides for manual tare compensation.

Coarse coordination of the zero point for the computer complex component (not shown) with the visual weight projection zero point is facilitated by annular adjustment of the encoder 175 in its mounting, in the manner hereinbefore discussed. Fine coordination of these zero points is best accomplished by adjustment of the axis of the beam splitter mirror 391 about its effective axis in the visual system 27. In addition, slight movement of the screen 327 on the face 44 of the scale 10 facilitates minor fine coordination of the visual zero point in the visual system 27 with the encoder.

As has been pointed out, the screen 327 is prominently positioned on the face 44 of the scale 10. Referring to FIGURE 1 once more, certain indicating lights 440 and controls 441 are also positioned on the scale face 44. They are not described at length here since they form no specific part of the present invention.

Having read the foregoing description, it will be recognized that a scale has been described which provides extremely accurate weight information to a computer and to operating personnel. The finely machined and light weight components of its balance arrangement 26 and visual system 27 assure low inertia operation of the scale. The weight to counterforce ratio of 1.5 to 1 facilitated by the lever arrangement 25 assures rapid response to load and subsequent recovery (enhanced by the light weight components and minimal friction developed). The optical weight transmission arrangement introduces minimal friction. Adjustment of the scale is simple and quickly accomplished.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. In a weight information transmission system for a low inertia weighing scale, wherein the weight applied to a scale tray or the like is measured by rotation of a generally horizontal shaft, the improvement comprising: a weight information wheel mounted on a free end of said shaft, said weight information wheel including spider means having a center hub and a weight information ring mounted on the periphery of said spider means, said hub extending axially beyond said free end of said shaft, balancing means on said hub for balancing said wheel on said shaft, said balancing means extending through said hub outside of said free end of said shaft, weight chart means on said ring and a highly reflective surface on said chart means, and scanning means for picked up correct weight information from said chart means as weight is applied to the scale tray and said shaft rotates, said scanning means projecting an image of said reflective surface onto a viewing screen for viewing by operating personnel.

2. The improvement in weight information transmission system of claim 1 further characterized in that said balancing means includes a pair of threaded balancing pins extending at right angles through appropriately threaded apertures in said hub outside of said free end.

3. The improvement in weight information transmission system of claim 1 further characterized in that said spider means has radially extending arms and is fabricated of a light metal alloy, the free ends of said radially extending arms having co-planar platforms formed thereon, said ring being fabricated of thin sheet metal and mounted on said platforms.

4. The improvement in weight information transmission system of claim 3 further characterized in that said hub has a tapered passage extending axially through it for seating snugly and precisely onto the correspondingly tapered free end on said shaft, said hub protruding axially beyond the tapered end of said shaft, and a pair of fully threaded balancing screws extending at right angles to each other through appropriately threaded apertures in the hub outside the tapered end of the shaft.

References Cited

UNITED STATES PATENTS

| | | | |
|---|---|---|---|
| Re. 23,738 | 11/1953 | Moline et al. | 88—24 |
| 1,166,658 | 1/1916 | Buckingham | 177—178 X |
| 1,871,877 | 8/1932 | Buckman | 88—24 |
| 2,224,281 | 12/1940 | Webber | 88—24 |
| 2,321,346 | 6/1943 | Williams | 177—173 |
| 2,322,813 | 6/1943 | Beck | 177—178 X |
| 2,452,646 | 11/1948 | Frankel | 88—24 |
| 2,658,746 | 11/1953 | Karp et al. | 177—168 |
| 3,100,720 | 8/1963 | Carroll | 177—174 X |
| 3,114,284 | 12/1963 | Vargady | 88—24 |
| 3,144,807 | 8/1964 | Coombs | 88—24 |
| 3,181,633 | 5/1965 | Worst | 235—61 |
| 3,185,229 | 5/1965 | Bell et al. | 88—24 |

FOREIGN PATENTS 595,262   3/1960   Canada.

ROBERT S. WARD, Jr., *Primary Examiner.*

RICHARD B. WILKINSON, *Examiner.*

UNITED STATES PATENT OFFICE
CERTIFICATE OF CORRECTION

Patent No. 3,376,943                                       April 9, 1968

Edward C. Karp

It is certified that error appears in the above identified patent and that said Letters Patent are hereby corrected as shown below:

Column 1, line 67, "justified" should be -- justifying --. Column 2, line 3, "or" should read -- of --. Column 4, line 41, "7" should read -- 57 --. Column 11, line 29, "facilitaties should read -- facilitates --. Column 12, line 17, "then" should read -- the --; line 39, "25°" should read -- 20° --. Column 13, line 16, "karp" should read -- Karp --. Column 14, line 17, "picked" should read -- picking --.

Signed and sealed this 16th day of September 1969.

(SEAL)
Attest:

Edward M. Fletcher, Jr.                                  WILLIAM E. SCHUYLER, JR.

Attesting Officer                                                    Commissioner of Patents